(No Model.)

J. D. LYON.
AXLE LUBRICATOR.

No. 550,833. Patented Dec. 3, 1895.

WITNESSES:
William Goebel
Theo. G. Hoster

INVENTOR
J. D. Lyon
BY Munn & Co.
ATTORNEYS.

ANDREW B.GRAHAM, PHOTO-LITHO. WASHINGTON, D.C.

UNITED STATES PATENT OFFICE.

JESSE D. LYON, OF HIGGINSPORT, OHIO.

AXLE-LUBRICATOR.

SPECIFICATION forming part of Letters Patent No. 550,833, dated December 3, 1895.

Application filed April 5, 1895. Serial No. 544,609. (No model.)

*To all whom it may concern:*

Be it known that I, JESSE D. LYON, of Higginsport, in the county of Brown and State of Ohio, have invented a new and Improved Axle-Lubricator, of which the following is a full, clear, and exact description.

The object of the invention is to provide a new and improved axle-lubricator which is comparatively simple and durable in construction and arranged to properly lubricate the axle from a reservoir held on the hub.

The invention consists principally of a reservoir formed at the end of the hub by the hub-band and a cap secured thereto.

The invention also consists of certain parts and details and combinations of the same, as then will be hereinafter fully described, and pointed out in the claims.

Reference is to be had to the accompanying drawings, forming a part of this specification, in which similar letters of reference indicate corresponding parts in all the views.

Figure 1:
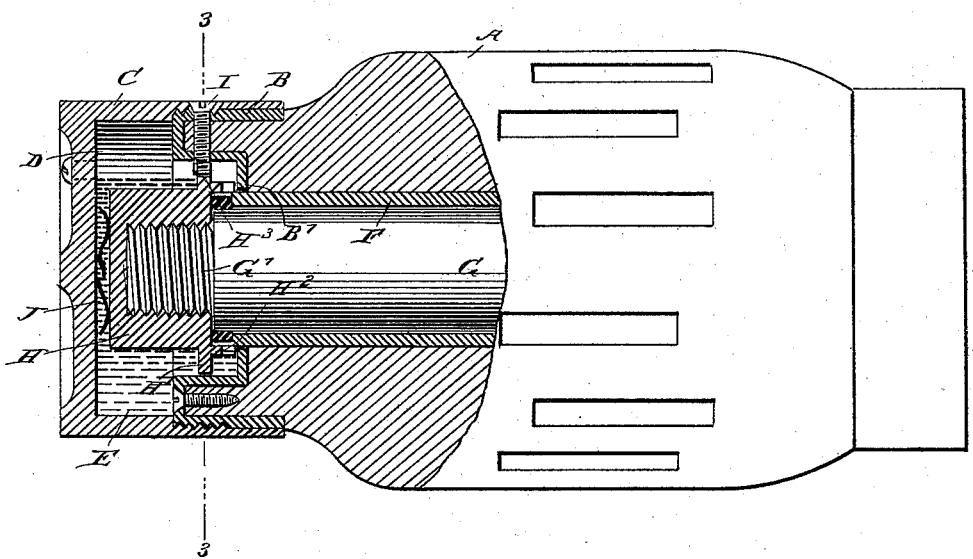
Figure 2:
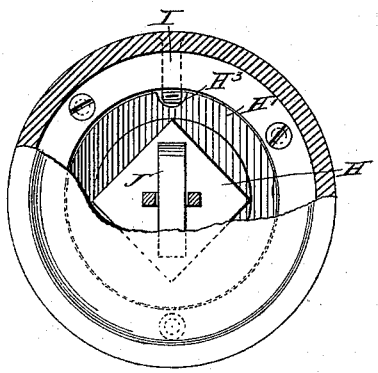
Figure 3:
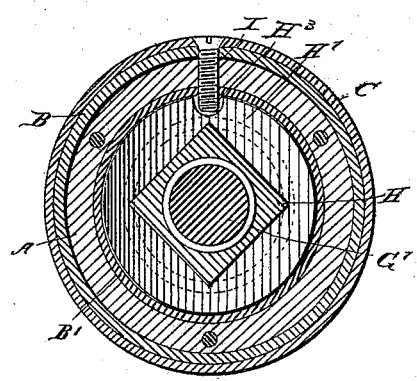

Figure 1 is a sectional side elevation of the improvement as applied. Fig. 2 is an end elevation of the same with part in section, and Fig. 3 is a transverse section of the same on the line 3 3 of Fig. 1.

The hub A of the wheel on which the lubricator is applied is provided with the hub-band B, formed with an integral flanged cup B', fitting into a recess in the outer end of the hub A. The band B is provided with external screw-threads engaged by internal screw-threads in the flange of a cap C, adapted to form with the hub-band B a reservoir D to contain the lubricant E. The joint between the said cup B' and the wooden recessed face of the hub is preferably made tight by lead, cement, or other suitable packing, so that the lubricant cannot affect the wooden hub.

The hub A is provided with the usual box F, through which passes the spindle G of the axle, and on the outer threaded end G' of the spindle screws the axle-nut H, formed with an annular flange H', extending into the cup B', but a suitable distance from the apertured bottom of the cup, as plainly shown in Fig. 1, to permit the lubricant to pass to the box F and spindle G to lubricate the same. From the flange H' extends inwardly an annular flange $H^2$, formed with notches and adapted to rest on the bottom of the cup B'.

In the flange H' of the nut H is formed a notch $H^3$, adapted to be engaged by the inner end of a screw I, passing through the cap C, the hub-band B, hub A, and cup B', as plainly shown in the drawings. When this screw I is removed, the opening left in the hub-band B and flange of the cap C permits of filling the reservoir with oil, and when the screw is inserted it closes the said aperture. By screwing the screw I inward to engage the notch $H^3$ the screw serves for unscrewing the nut H whenever it is desired to remove a wheel from the spindle, as the revolving of the hub in an inverse direction to the forward movement of the wheel causes the screw I to turn the nut H, as the latter is locked to the hub-cap and hub-band by the screw I. A spring J presses against the face of the nut H, the said spring being secured to the inside of the cap C, as plainly shown in the drawings. This spring serves to center and hold the nut in its proper position with relation to the hub-band, cap, and screw I, when the wheel is removed in the manner before described.

Now it will be seen that by the arrangement described the lubricant can readily pass to the spindle to continuously lubricate the same as long as the reservoir contains lubricant.

It is understood that the oil is fed to the spindle by capillary attraction, aided by the motion of the bearing-surfaces, and by centrifugal action, due to the rotary motion of the boxing.

The waste-oil is carried out at the back end of the boxing, and as it is fed only as needed and when the wheel is moving a small quantity of lubricant will last a long time. An even supply of lubricant is kept on the spindle, from the fact that air must supply the place of the lubricant in the reservoir as it is fed out, and no air can reach the reservoir until the quantity of lubricant on the spindle becomes small enough to allow air to pass along the spindle from the back end. This holds a very uniform quantity of lubricant on the spindle as long as there is any lubricant in the reservoir.

Having thus described my invention, I claim as new and desire to secure by Letters Patent—

1. An axle lubricator provided with a hub band formed with a cup, a cap secured on the said hub-band to inclose the spindle nut and forming a dust protector for the spindle and means whereby the nut and the cap may be removed together from the spindle, substantially as shown and described.

2. An axle lubricator, comprising a hub-band, formed with a cup fitted in and secured to the outer recessed face of the hub, a cap having a screw thread engagement with the said hub-band, and a flanged nut screwing on the threaded end of the axle and having a notched annular flange adapted to engage the hub-band, substantially as shown and described.

3. An axle lubricator, comprising a hub-band, formed with a cup secured to the outer recessed face of the hub, a cap screwing on the said hub-band, a flanged nut screwing on the threaded end of the axle, and means, substantially as described, for locking the said nut to the said cap and hub-band, as set forth.

4. An axle lubricator, comprising a hub-band, formed with a cup and secured to the outer recessed face of the hub, a cap screwing on the said hub-band, a flanged nut screwing on the threaded end of the axle, and a packing material placed between the said cup and the face of the hub, substantially as shown and described.

5. An axle lubricator, comprising a hub-band, formed with a cup and secured to the outer recessed face of the hub, a cap screwing on the threaded end of the axle, and a spring held on the said cap and pressing on the said nut and adapted to hold the nut in its proper position relatively to the hub-band and cap when the wheel is removed, substantially as shown and described.

JESSE D. LYON.

Witnesses:
A. J. LOUDON,
FRANK L. LINDSEY.